May 7, 1963 F. E. SNOW ET AL 3,088,712
APPLICATOR AND MIXER FOR VISCOUS MATERIALS
Original Filed July 28, 1952 5 Sheets-Sheet 1

INVENTORS
FLOYD E. SNOW
JONES O. YORK
BY
ATTORNEY

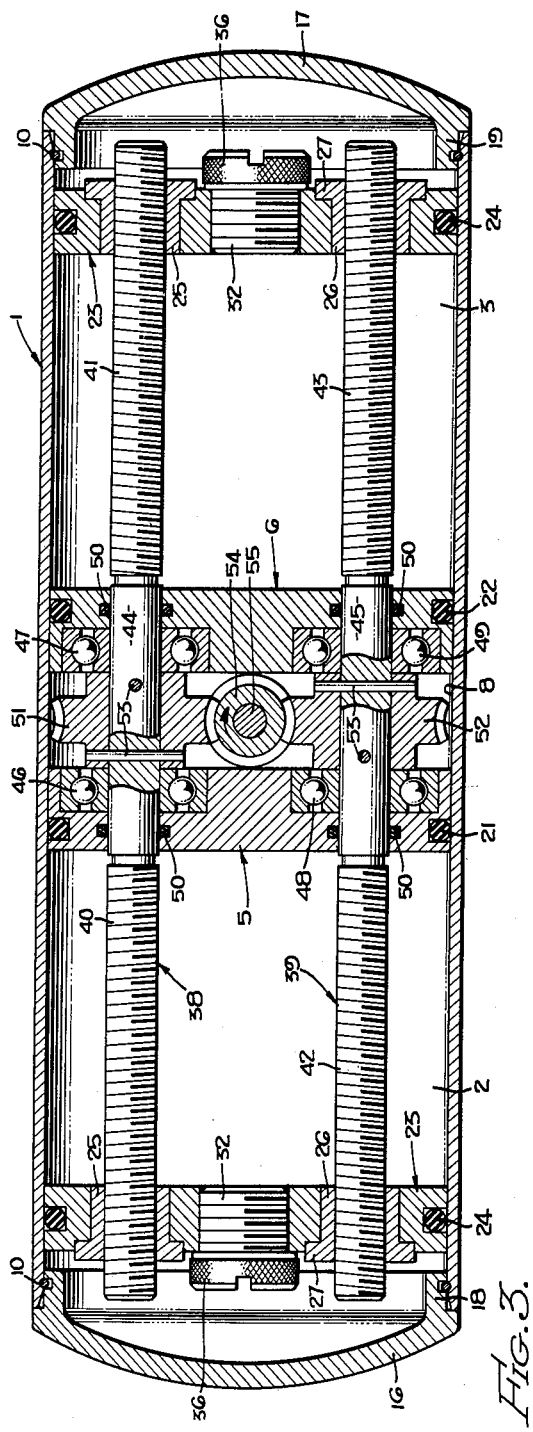
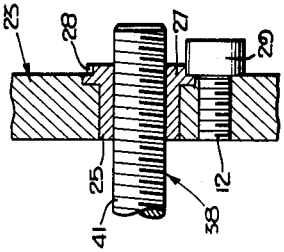
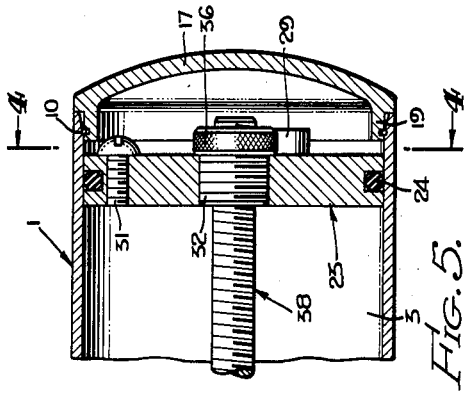
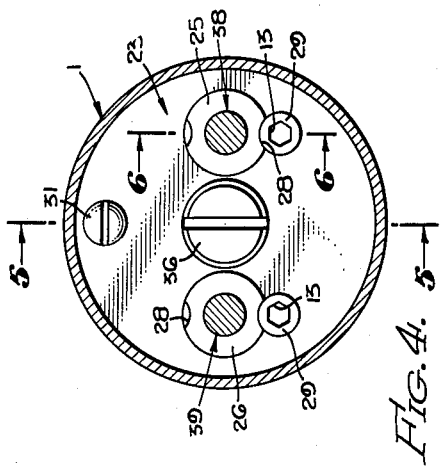

May 7, 1963 F. E. SNOW ET AL 3,088,712
APPLICATOR AND MIXER FOR VISCOUS MATERIALS
Original Filed July 28, 1952 5 Sheets-Sheet 3
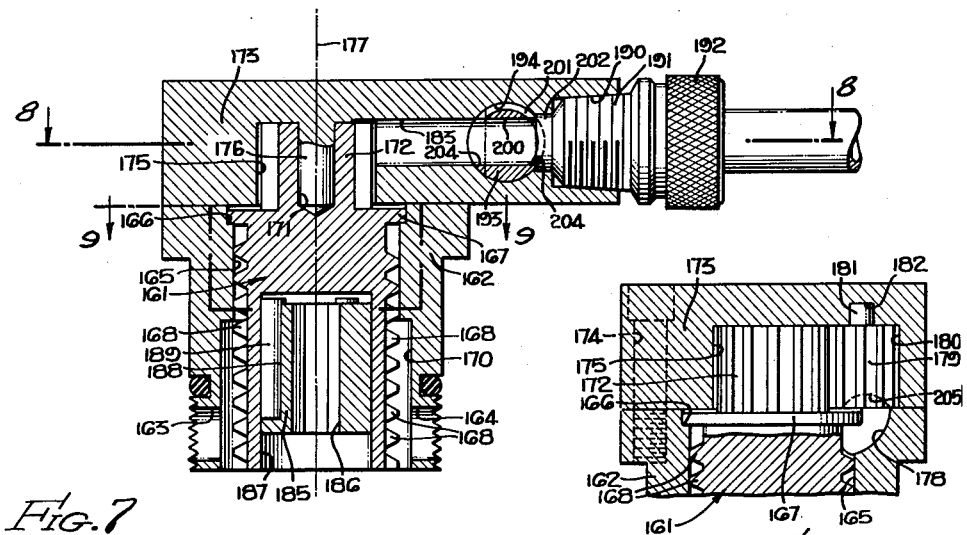
FIG. 7
FIG. 10
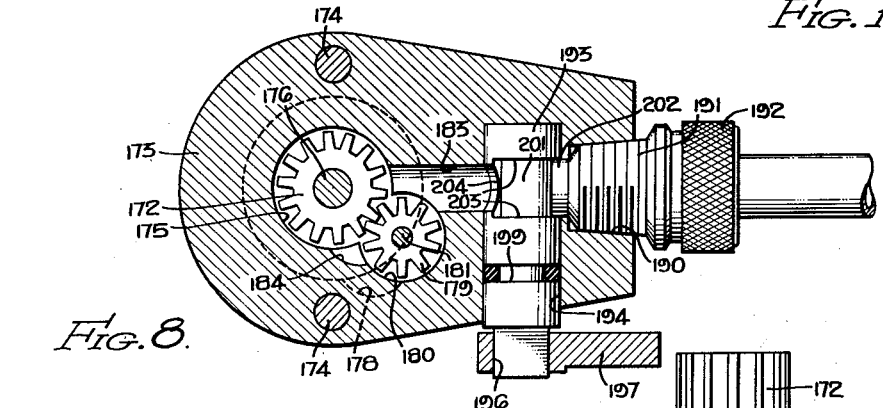
FIG. 8.
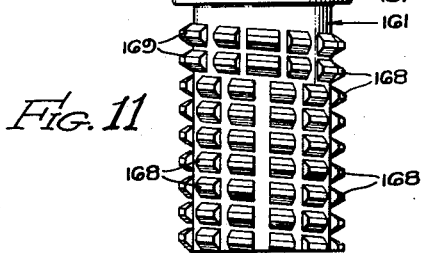
FIG. 11
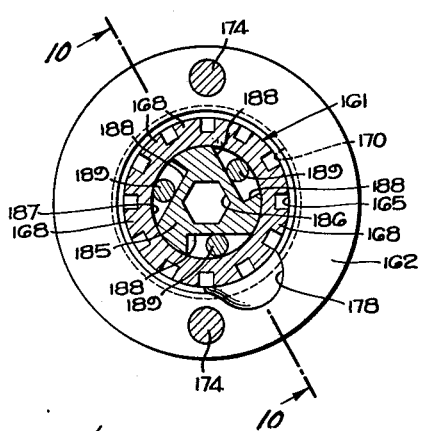
FIG. 9
INVENTORS
FLOYD E. SNOW
JONES O. YORK
BY
Flam and Flam
ATTORNEY

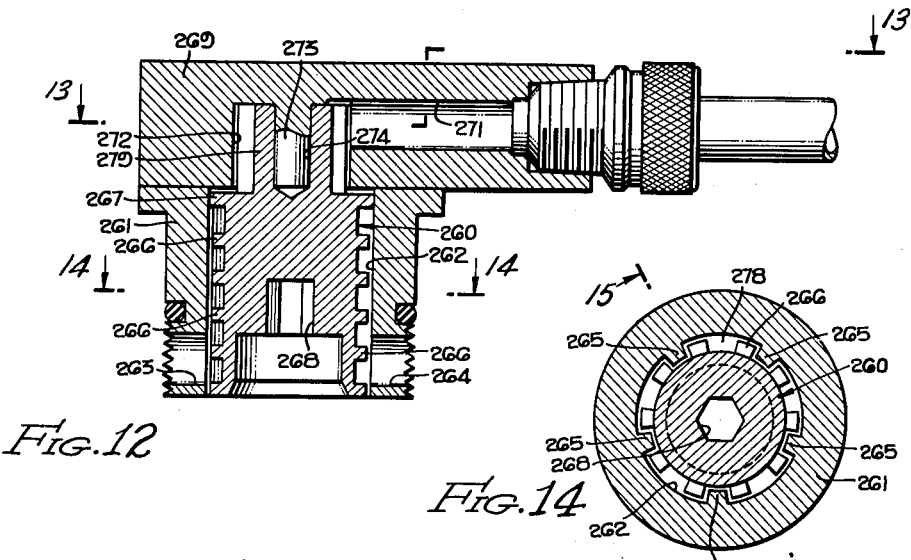
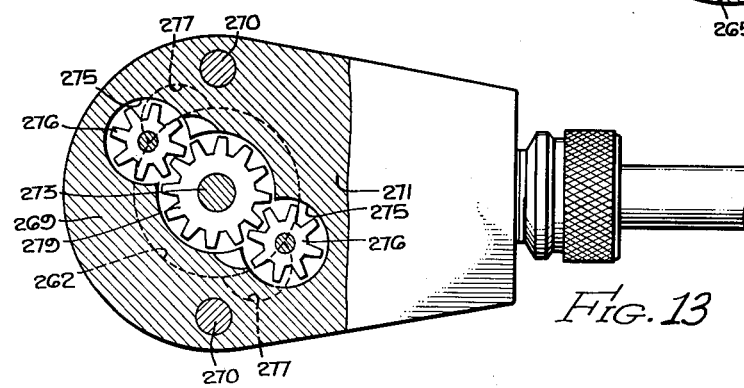
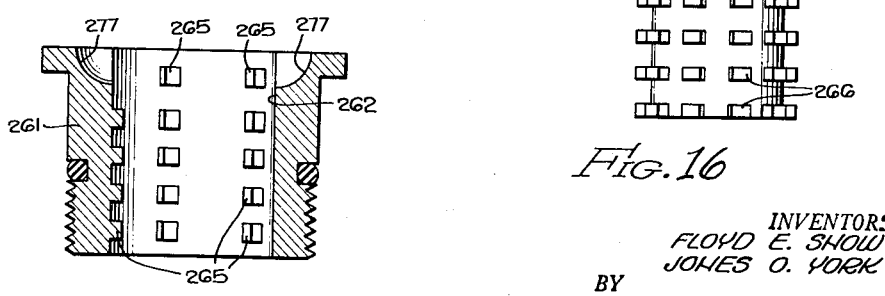

May 7, 1963
F. E. SNOW ET AL
3,088,712
APPLICATOR AND MIXER FOR VISCOUS MATERIALS
Original Filed July 28, 1952
5 Sheets-Sheet 5
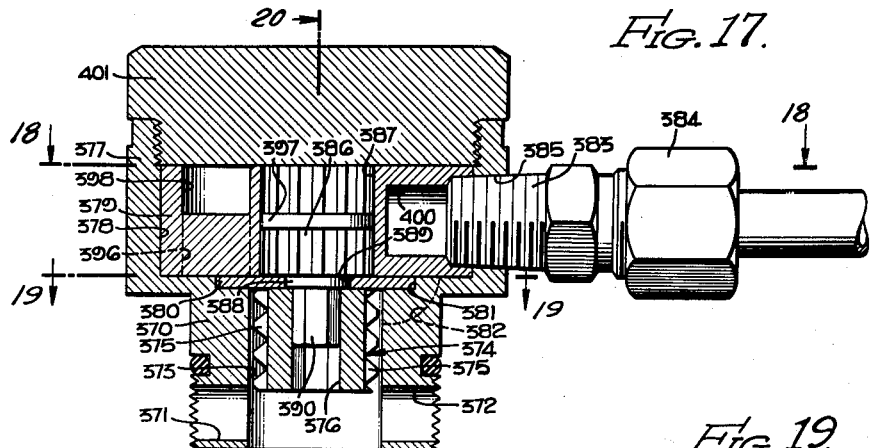
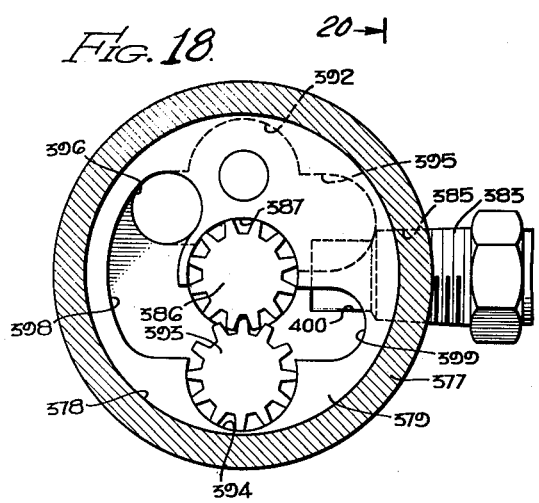
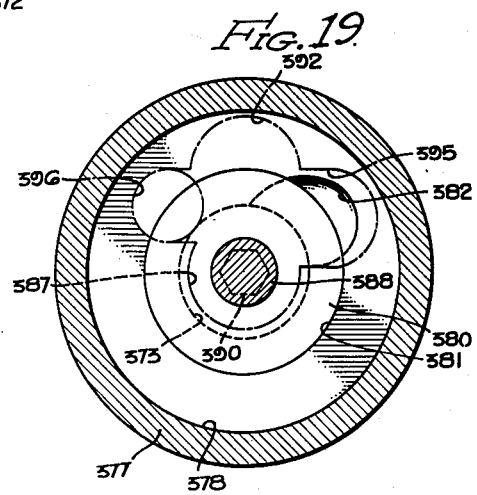
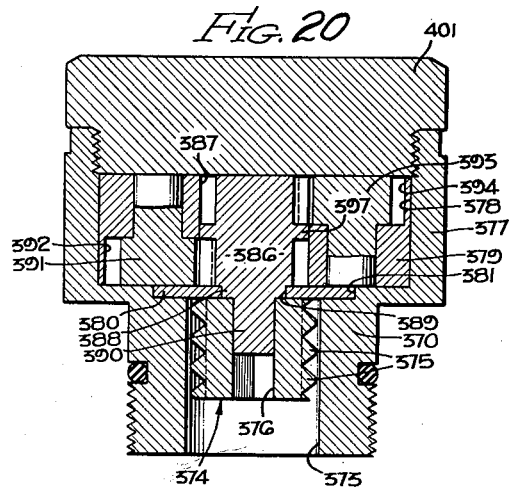
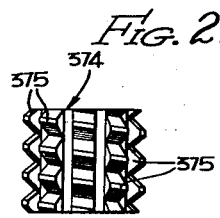
INVENTORS
FLOYD E. SNOW
JONES O. YORK
BY
Flam and Flam
ATTORNEY

United States Patent Office 3,088,712
Patented May 7, 1963

3,088,712
APPLICATOR AND MIXER FOR VISCOUS MATERIALS
Floyd E. Snow, Pasadena, and Jones O. York, Burbank, Calif., assignors, by mesne assignments, to Coast Pro-Seal & Mfg. Co., Los Angeles, Calif., a corporation of California
Original application July 28, 1952, Ser. No. 301,174, now Patent No. 2,814,827, dated Dec. 3, 1957. Divided and this application July 15, 1957, Ser. No. 677,173
8 Claims. (Cl. 259—7)

This invention relates to the application of viscous compounds or mixtures, such as rubber-like sealing compounds.

It is often essential to flow compounds of this character over localities where surfaces are in contact, as, for example, around the flange of a cover plate for airplane gasoline tanks.

Such compounds are also used around bolts and nuts. The compound usually includes rubber-like, tacky material that hardens on exposure to air.

The individual constituents of such a mixture are a rubber material and a catalyzer. When mixed, setting take place at a slow rate.

In order efficiency to utilize such compounds, they should accordingly be mixed at the time they are to be applied; for otherwise, setting of the mixture would render them incapable of use.

It is one of the objects of this invention to provide a compact and inexpensive mixer and applicator that performs the essential function of intimate intermixture of the constituent elements at the time the compound is to be used.

It is another object of this invention to provide a structure for the mixer that effectively and intimately associates the catlyzer and rubber material, preferably by a rubbing, as well as a cutting, or comminuting action.

It is still another object of this invention to facilitate the cleaning of the parts, as by ready and rapid removal of these parts. This feature is particularly important, since the materials treated are sticky or gummy.

This application is a division of my application filed July 28, 1952, for Applicator and Mixer for Viscous Materials, now Patent No. 2,814,827, issued December 3, 1957.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 3 is an enlarged sectional view, taken along a plane corresponding to line 3—3 of FIG. 2;

FIG. 4 is a sectional view, taken along a plane corresponding to line 4—4 of FIG. 5;

FIG. 5 is a sectional view, taken along a plane corresponding to line 5—5 of FIG. 4;

FIG. 6 is a fragmentary enlarged sectional view, taken along a plane corresponding to line 6—6 of FIG. 4;

FIG. 7 is a longitudinal sectional view illustrating a mixer incorporating the present invention;

FIGS. 8 and 9 are sectional views, taken along the planes indicated by lines 8—8 and 9—9 of FIG. 7;

FIG. 10 is a fragmentary sectional view, taken along the plane indicated by line 10—10 of FIG. 9;

FIG. 11 is an elevation of a part of the mechanism illustrated in FIG. 7;

FIG. 12 is a longitudinal sectional view illustrating a modified form of this invention;

FIG. 13 is a view, partly in section, along a plane indicated by line 13—13 of FIG. 12;

FIG. 14 is a sectional view, taken along a plane indicated by line 14—14 of FIG. 12;

FIG. 15 is a sectional view, taken along a plane corresponding to line 15—15 of FIG. 14;

FIG. 16 is an elevation of a part of the mechanism illustrated in FIG. 12;

FIG. 17 is a longitudinal sectional view illustrating still another modified form of this invention;

FIGS. 18, 19 and 20 are sectional views, taken along planes indicated by lines 18—18, 19—19 and 20—20 respectively of FIG. 17; and FIG. 21 is an elevation of a part of the mechanism illustrated in FIG. 17.

Figure 1:
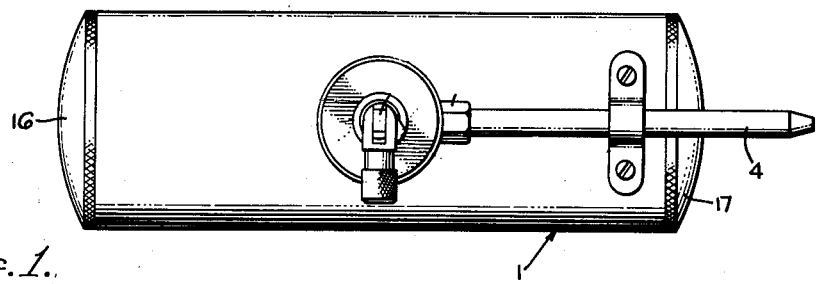
FIGURE 1 is a plan view of an apparatus incorporating the invention.
Figure 2:
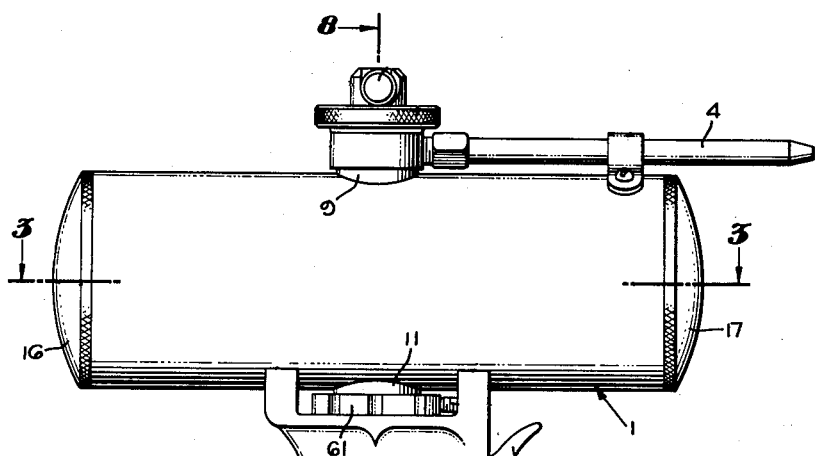
FIG. 2 is a side elevation thereof.

The device, as shown in FIGS. 1 and 2, includes a barrel 1 of generally hollow cylindrical configuration. This barrel is divided into two cylinder spaces 2 and 3 (FIG. 3) into which the two constituent materials (such as a catalyst and a rubber material) may be placed for ultimate discharge, under pressure exerted in these spaces, through a spout structure 4 (FIGS. 1 and 2) mounted on the barrel 1. The intermingling of the materials prior to discharge is effected in a manner to be hereinafter described.

In order to form the cylinder spaces 2 and 3, use is made of an intermediate wall or support structure comprising the mating halves 5 and 6 (FIGS. 8, 9, and 11). These halves are of generally cylindrical configuration to fit the interior of the cylinder barrel 1. They are provided with appropriate mating recesses to define apertures for bearings, etc., all as hereinafter described. The halves 5 and 6 are held together by four screws. As shown most clearly in FIG. 3, O-rings 21 and 22 are provided in grooves formed in the peripheries of these halves so as to isolate the cylinder spaces 2 and 3 from each other.

The opposite ends of the inner bore of barrel 1 are each provided with an outward taper for the accommodation of the cover members 16 and 17 (FIGS. 1, 2, 3, and 5). These cover members are provided with the flanges 18, 19, respectively telescoping into the ends of the barrel 1 and fastened thereto as by snap rings 10.

Halves 5 and 6 cooperate to define a space 8 in which appropriate mechanism is located for the operation of piston structures in the cylindrical spaces 2 and 3. This mechanism will be described hereinafter.

A threaded mixer body 9 (FIG. 2) is accommodated in a threaded aperture or socket formed by the halves 5 and 6, and is bottomed therein. The axis of this body is transverse to the axis of barrel 1. It passes radially into the barrel through a radial aperture, and thus serves to restrain relative axial movement between the barrel 1 and the structure 5—6. It also serves as a main support for the disintegrating and mixing elements.

A bushing 11 (FIG. 2) extends coaxially with the body 9, at the lower side of the barrel 1, and is similarly threaded into an appropriate threaded aperture formed by the halves 5 and 6. The bushing 11 is bottomed in this threaded aperture.

Two identical piston structures, respectively in the cylinder spaces 2 and 3, are provided for urging the material from these two spaces 2 and 3 through the chopper and mixer mechanism supported by the mixer body 9.

These piston structures are shown to best advantage in FIGS. 3, 4, 5, and 6.

Each piston structure includes a cylindrical piston proper 23, carrying a sealing O-ring 24 located in a groove in the periphery of the piston. A pair of spaced nuts 25 and 26, having exterior cylindrical surfaces, are telescoped within appropriate apertures in the piston 23. Flanges 27 on these nuts extend partially into counterbores of these apertures. The peripheries of the flanges, as shown most clearly in FIGS. 4 and 6, are each provided with a pair of arcuate recesses 28 at diametrically opposite places of the flange. These recesses form plane surfaces coplanar with the end surfaces of the piston 23. Engaging one of these recesses is the cylindrical head 29 of screw 12, threaded in an aperture adjacent the nut 26. This head 29 has a hexagonal recess 13 (FIG. 4) to permit removal and replacement of the screw. In this way, the nuts are prevented from rotating, and they are also restrained against axial movement with respect to the piston 23. The two recesses of each nut 26 make it possible to adjust the angular positions of the nuts by half revolutions.

In order to gain access to the spaces 2 and 3, removable threaded plugs 32 are provided in each of the pistons 23. Knurled and slotted head 36 is provided for manual manipulation.

Thus, to gain access to the spaces 2 and 3 to insert ingredients to be mixed, the covers 16 and 17, as well as the plugs 32, may be removed.

For moving the pistons 23 simultaneously toward the wall 5—6, use is made of a pair of lead screws 38 and 39. These lead screws respectively have two threaded sections 40, 41 and 42, 43. The sections 40 and 41 are of opposite threads, as are the sections 42 and 43. Accordingly, simultaneous rotation of the lead screws will move the pistons 23 toward each other. The rate at which the materials in cylinder spaces 2 and 3 are urged into the mixer body 9 is dependent upon the relative pitches of sections 40, 41 and 42, 43. Thus, if the materials are to be delivered in equal amounts, the pitches are equal. Assuming that the material in the lefthand chamber 2 is to be delivered at a faster rate than the material in chamber 3, then, in that event, the pitches of the threaded sections 40 and 42 are made correspondingly greater. Obviously, in this manner any desired ratio of ingredients may be secured.

The lead screws 38 and 39 (FIG. 3) are each provided with a cylindrical shaft portion 44 or 45, located intermediate the threaded sections. These shaft portions are appropriately supported in radial and thrust bearing structures 46, 47, 48, and 49, located in recesses in the wall halves 5 and 6 (FIG. 3) and opening into the space 8. Appropriate O-rings 50 surround the shaft portions 44 and 45, and are located in grooves formed in the halves 5 and 6.

In order to rotate the lead screws 38 and 39, these lead screws are provided with worm wheels 51 and 52. These worm wheels may be appropriately joined to the shaft portions 44 and 45 as by the aid of the cross pins 53.

A common driving worm 54 engages both of the worm wheels 51 and 52. This worm is located in the space 8, and is mounted on a shaft 55 coaxial with body 9 and bushing 11. This shaft is appropriately driven by an air motor mechanism encased in a hollow handle or housing 59 (FIG. 2). Air may be supplied to the air motor in the housing 59 by the aid of an air hose 60. The housing 59 is arranged to be held appropriately in place by the aid of a nut structure 61 cooperating with the bushing 11. Rotation of the air motor is controlled by a trigger 66 (FIG. 2) which may be optionally operated to cause the air motor to rotate in either direction or to stop the air motor. In this way, the pistons 23 may be caused to move in either direction for the mixing operation, as well as for the retraction of the pistons 23 for the purpose of reloading the barrel 1.

The pistons 23 urge the materials to be mixed through appropriate ports formed in the wall halves 5 and 6 to the mixer body 9.

In the form shown in FIGS. 7 to 11, a mixer body 162 is provided in place of the mixer body 9. However, it is provided with a threaded lower end for reception in the threaded recess provided by the halves 5 and 6. The body member 162 has at its lower end inlet ports 163 and 164 cooperable with the ports of the halves 5 and 6 respectively. The body member has a through axial bore 165 that accommodates a rotary interrupted threaded chopping member 161. An annular flange 166 is formed at the upper end of the body member cooperable with a flange 167 of the chopper member for limiting downward movement of the chopper member 161 with respect to the body member 162. Projections 168 of the chopping member 161 and provided in the form of peripherally interrupted flanges arranged in this instance spirally as interrupted threads. The projections are not all axially aligned. Accordingly, the flow of the materials is caused to follow a path having substantial changes in directions whereby the materials are thoroughly intermixed.

The bore 165 of the body member has only slight clearance with respect to the upper turns of the helically arranged projections 168. Flow of the material is then made to progress through the spaces between the projections 168. While the projections are arranged helically, they are in left-handed arrangement. Accordingly, angular rotation of the chopping member 161 in a clockwise direction as viewed from above does not aid in the ultimate upward flow of the material. While upward flow is permitted by the spacing between the projections, the helically arranged projections 168 produce a churning action.

At the lower portion of the body member 162, the bore 170 is enlarged to provide an annular space facilitating entry of the material into the body member 162 through the ports 163 and 164. The material is thus easily permitted to come in intimate contact with the projections 168 of the chopping member 161.

The chopping member 161 carries a spur gear 172 extending above the body member 162. A cap member 173 provides an appropriate recess 175 for accommodating the gear 172. The cap 173 closes the body member 162 and is secured by the aid of bolts 174. This cap member has an integrally formed downwardly extending pin projection 176 accommodated within a corresponding bore 171 of the gear 172. The pin 176, together with the closely fitting bore 165, guides the chopping member 161 for rotation about its longitudinal axis 177.

As shown most clearly in FIGS. 8, 9 and 10, a groove 178 at the upper end of the body member 162 forms the outlet passageway from the body member 162. This groove 178 forms a path leading around the flange 167 to a recess 205 (FIG. 10) in the cap 173.

A gear 179 is accommodated in an arcuate recess 180 of the cap member 173 that communicates with the recess 175 for the gear 172. The gear member 179 has a shaft extension 181 fitting in an appropriate recess 182 of the cap member 173 for guiding the gear member for rotation. This gear member 179 is in engagement with the gear 172, and is rotated thereby.

The passage forming grooves 178 and 205 are in communication with the bottom of the gear 179. An outlet passage 183 in the cap 173 communicates with the upper portions of both gear recesses 175 and 180, as shown in FIGS. 7 and 8.

Assuming a clockwise rotation of the chopping member 161, as viewed in FIG. 8, the gear member 179 is caused to rotate in a counterclockwise direction. The material passing from the body member 162 and into the cap 173 by the aid of the grooves 178 and 205 enters the spaces between the teeth of the gear member 179 and is carried arcuately and upwardly in the gear recess 180. The outlet passage 183, communicating with the upper portion of recess 180, receives that portion of the material in recess 180 that is at the higher level, and such portion may then pass outwardly of the mixing member. Another portion of the material in recess 180 that is at the lower level therein is brought into contact with the teeth of the driving gear 172, and may pass to an intermediate collection point formed by a recess 184 (FIG. 8) communicating with the upper portions of the gear recesses 175 and 180. From this collection point, some material may be urged again around the gear recess 180. Another part of the material in the recess 184 is carried by the gear 172 clockwise about its recess 175 and thence to the outlet passage 183. The material thereby becomes further intermixed.

The gear members 172 and 179 act as a pump that aids the flow of material through the device. Accordingly, a high rate of flow can be achieved without requiring the pistons 23 to develop an extremely high pressure in the cylindrical spaces 2 and 3, which might otherwise be of the order of several hundred pounds per square inch. An improved operation is thus achieved. The gears furthermore cause a substantial intermixture of the material by engagement of the teeth of the gear members 171 and 179, as well as by smearing action.

Since the projections 168 of the chopper member 161 are arranged helically, but in left-handed arrangement, a reversal of the air motor mechanism might induce a flow of material outwardly of the passage 183 without the application of pressure by the pistons 23. It is thus important that the mixer be inoperative while the pistons 23 are retracted, such as for refilling the chambers 2 and 3. A one-way drive for the chopping member 161 ensures against such undesired flow. For this purpose, a clutch member 185 is provided that has an appropriate non-circular recess 186 for coupling the shaft 55. This clutch member 185 is accommodated in an axial recess 187 in the bottom of the chopping member 161. The member 185 has a series of angularly spaced, longitudinally extending slots 188 facing the bore 187. Each of these slots 188 is of maximum depth, or minimum distance from the axis of rotation at the clockwisemost portion of the slots, and is of continuously decreasing depth or increasing radial distance in the counterclockwise direction of the slots 188. The slots 188 thus form wedge-shaped spaces with the bore 187.

Accommodated within the slots 188 respectively are rolling elements 189, the diameters of which are such that they may be accommodated at the clockwisemost portion of the slots 188 without contacting the wall forming the bore 187 of the chopping member 161. Upon clockwise rotation of the clutch member 185 in the position illustrated in FIG. 9, the rolling eleemnts are urged toward the counterclockwisemost position of the slots 188, bringing the rolling elements 189 into engagement with the wall forming the bore 187. Accordingly, upon clockwise rotation of the clutch member 185, the rolling elements 189 become firmly wedged to couple the chopping member 161 for rotation with the clutch member 185. Upon reversal of the air motor mechanism, the clutch member 185 is caused to rotate in a counterclockwise direction, as viewed in FIG. 9. Accordingly, the rolling elements 189 are urged to the deep end of the slots 188, thereby unclutching the chopping member 161 from the mechanism. Reversed rotation of the chopping member 161 is thus prevented.

The cap member 173 has an interiorly threaded portion 190 in alignment with the outlet port 183, for cooperation with a threaded extension 191 of a coupling member 192 for the nozzle 4.

For controlling the flow of material through the mixing mechanism, a plug valve 193 cooperates with the outlet passage 183. This plug 193 is substantially of cylindrical form and is accommodated in a cylindrical recess 194 intersecting the outlet passage 183 at right angles thereto. This recess 194, opening on one side of the cap member 173, permits insertion of the plug 193. The plug 193 has a non-circular end 195 engaged by a corresponding aperture 196 of an operator 197. A resilient O-ring 198 accommodated in an appropriate groove 199 in the plug 193 prevents outward flow of material along the closure 193.

As shown most clearly in FIG. 7, the plug 193 has a through transverse port 200 that may be aligned with the outlet passage 183 for uninterrupted flow through the device. For limiting movement of the plug 193 and for maintaining it in assembled relationship with the cap 173, an arcuate slot 201 extends partially around the outside of the plug 193. The threaded extension 191 has a reduced cylindrical portion 202 that extends within the slot 201. This cylindrical projection 202 has a diameter corresponding to the axial distance between the opposed axially spaced walls 203 of the recess 201. Accordingly, when the apparatus is in assembled position, the plug 193 is prevented from moving axially in the recess 194. This ensures proper alignment of the outlet passage 183 with the through port 200. Furthermore, the projection 202 limits angular adjustment of the plug 193 by engagement with the arcuately spaced end walls 204 of the recess 201. As illustrated in FIG. 7, the projection 202 is engaged by one end wall of the recess, corresponding to counterclockwisemost adjustment of the plug 193. This end wall is so located that it corresponds precisely to accurate alignment of the port 200 with the outlet passage 183. Clockwise rotation of the plug 193, from the position illustrated in FIG. 7, is limited by the other end wall of the recess and ensures against unintentional movement of the closure 193 beyond fully closed position.

The form of the invention illustrated in FIGS. 12 to 16 is similar to the form illustrated in FIGS. 7 to 11. It utilizes both a rotary chopping member 260 and a gear pump construction. The gear pump causes intimate intermixture and reduces the pressure required to be produced by the pistons 23.

A main body member 261 is threadedly accommodated in the halves 5 and 6. The main body member 261 has an axial aperture 262 guidingly receiving the chopping member 260. Inlet ports 263 and 264 are provided on opposite sides of the body member 261 for feeding the material into the aperture 262.

In the present instance, the main body member 261 has a plurality of longitudinally spaced series of angularly spaced projections 265 (FIGS. 14 and 15) cooperating with a corresponding plurality of longitudinally spaced series of angularly spaced projections 266 of the chopping member 260. The chopping member 260 can be telescoped into the body member 261 by angularly displacing the projections 265 and 266 of the members 261 and 260, respectively, before the parts are moved axially together. Such angular position is shown most clearly in FIG. 14. A flange 267 at the upper portion of the chopping member 260 is disposed above the uppermost series of projections 265 of the body member 261. In such assembled position, the series of projections 266 of the rotary chopping member 260 are longitudinally spaced from the series of projections 265 of the body member 261. Accordingly, when the chopping member is so located, it may be rotated with the body member 261, the projections 266 longitudinally interleaving with the projections 265 of the body member 261.

The material entering the aperture 262 of the main body member 261 under pressure through the inlets 263 and 264 must move around the relatively rotating projections, thereby causing mixing of the material. As shown most clearly in FIG. 14, there are only five projections 265 in each series of projections of the main body member 261. There are ten projections in each series of projections of the chopping member 260. Accordingly, for any angular position of the chopping member 260 in the main body member 261, there are five substantially uninterrupted longitudinal paths for the material that is mixed. Such paths are illustrated by the reference character 278, for instance. Such uninterrupted paths 278 are not undisturbed, since the projections 265 of the main body member soon cross such paths upon rotation of the chopping member. Other distinct through longitudinal passages are then formed. The interleaving projections thus completely mix the different materials entering through the ports 263 and 264.

For rotating the chopping member 261, an appropriate non-circular aperture 268 is provided in the bottom thereof for engagement with the non-circular extension of the air motor shaft.

A cap member 269, secured to the main body member 261 by the aid of bolts 270, provides the outlet passageway 271 for the material. The cap member 269 has a recess 272 accommodating a gear member 279 integrally joined to the top of the chopping member 260. An integrally depending pin 273 of the cap 269 is accommodated in a corresponding axial recess 274 of the gear 279 for guiding the chopping member 260 and gear member 279 for angular movement.

As shown most clearly in FIG. 13, the cap member 269 has a pair of arcuate recesses 275 communicating with the gear recess 272 on diametrically opposite portions thereof. These recesses 275 accommodate gear structures 276 that are rotated by engagement with the gear-toothed projection 279. These gears operate as pumps interposed in the passageway for the material, and greatly assist in the flow of material through the mixer. Material from the chopping chamber 262 can pass to the gear structures by the aid of slots 277 in the main body member 261. These gear structures, in addition to pumping the material into the outlet passage 271, also serve further to produce an intimate intermixture of the materials.

In the form illustrated in FIGS. 17 to 21, a main body member 370 is threaded at its lower end for cooperation with a recess as before. The main body member 370 has inlet ports 371 and 372 for the material. These inlet ports 371 and 372 communicate with an axial bore 373 of the main body member, forming a mixing chamber.

In this chamber 373 is a rotary chopping member 374 (FIG. 21) formed by a series of helically arranged interrupted threads or projections 375. The rotary chopping member 374 has a through non-cylindrical bore 376 engageable with the shaft of the air motor, or the like. The spaced projections 375 cooperate with the wall forming the bore 373 to define irregular paths of the material, for mixing.

The interrupted turns forming the projections 375 are left-handed, whereby the material is not thereby aided in its ultimate upward movement. The chopper member 374 provides a slightly reverse movement of the material and produces a churning effect of the material as it passes upwardly thereof, improving the mixing of the material.

The axial bore 373, in which the chopper member 374 extends, is closed by a disc 380 accommodated in a circular recess 381 of the main body member 370.

For permitting passage of the material upwardly from the chamber 373 of the body member 370, a slot 382 (FIGS. 17 and 19) is provided. This slot 382 defines a passageway between the upper portion of the mixing chamber 373 to the upper surface of the body member 370, the slot 382 leading around the disc or plate 380.

The main body member 370 has an upwardly extending annular flange 377 forming a circular recess 378 in which a gear pump structure is accommodated. The flange 377 has an interiorly threaded through transverse aperture 385 forming the outlet from the body member.

In the annular recess 378 is disposed a stationary passage-forming member 379 (FIG. 18) that guides the material from the mixing chamber 373 to the outlet 385. This passage-forming member 379 defines communicating lower and upper passageways, respectively, in the lower and upper surfaces of member 379. The inlet to the lower passageway is formed by a recess 395 registering with the slot 382 of the main body member 370. This recess 395 has a depth corresponding to about half the thickness of the member 379, and opens downwardly thereof. The outlet from the lower passageway is formed by a through longitudinal aperture 396 in the member 379 that is angularly spaced from the inlet recess 395.

A through axially extending bore 387 in the member 379 intersects the inlet recess 395 and outlet aperture 396 at one side thereof; an arcuate recess 392 in member 379 (see FIG. 20), facing downwardly of the passage-forming member 379, also intersects the inlet recess 395 and outlet 396 opposite the bore 387. The bore 387 and recess 395 intersect each other, and form the central portion of the lower passageway. The outline of the lower passageway formed in the member 379 is shown in phantom lines in FIG. 19. The arcuate recess 392 guidingly receives a spur gear 391 (FIG. 20), and the through bore 387 guidingly receives a main gear structure 386. These gear structures 391, 386 are in engagement and form a gear pump interposed in the lower passageway. The main gear 386 has an annular flange 388 below the member 379 that is received by a circular recess 389 of the disc 380.

An upper passageway is formed by the stationary member 379. The inlet to the upper passageway is formed by the through bore 396. An arcuate recess 398 (FIGS. 17 and 18) communicates with the aperture 396. The depth of the entire upper passageway corresponds to the depth of the recess 398, as indicated in FIG. 17. The outlet from the upper passageway is formed by an arcuate recess 399.

As illustrated most clearly in FIG. 18, the central longitudinal bore 387 communicates with the arcuate recess 398 and the outlet recess 399 at one side thereof; an arcuate recess 394 in the member 379, facing upwardly of the member 379, also intersects the arcuate recess 398 and outlet recess 399 opposite the bore 387. The axial or central bore 387 and recess 394 communicate with each other, and form the central portion of the upper passageway.

The arcuate recess 394 accommodates a spur gear 393 (see, also, FIG. 20) that is in engagement with the gear structure 386. Accordingly, the gear structures 393, 386 provide a gear pump structure extending across the upper passageway, and in series relationship with the pump structure in the lower passageway.

The gear structure 386 has an annular flange 397 (FIGS. 18 and 20) intermediate its length for preventing undesired passage of the material along the length of the gear, and restricting flow of material between the lower and upper passages to the longitudinal aperture 396.

Communicating with the outlet recess 399 is an outlet chamber 400 accommodating the end of a threaded projection 383 of a coupling member 384. The passage-forming member 379 is maintained in a definite angular position corresponding to registry between the slot 382 and the inlet port 395 by engagement of the passage-forming member 379 with the threaded projection 383 of the coupling member.

A non-circular projection 390 of the gear structure 386 is received in the non-circular bore 376 of the mixing member 374. Accordingly, upon rotation of the mixing member 374, the gear structure 386 is rotated. The spur gears 391 and 393, being in engagement with the gear structure 386, are caused to rotate in their recesses.

Assuming a clockwise direction of rotation of the gear structure 386, as illustrated in FIGS. 18 and 19, it is apparent that the material is carried about the gear accommodating recesses. Substantial smearing action is produced, as well as admixture by virtue of the interengagement of the gear structures.

The material enters the inlets 371 and 372, passes around the mixing member 374 in the chamber 373, upwardly in the arcuate slot 382. The material then enters the lower passageway of the member 379 at the recess 395 registering with the slot 382, then around the recesses 392 and 387 by the gears 391 and 396, then to the through aperture 396. The material then enters the upper passageway at the arcuate recess 398, and is carried around the recesses 394 and 387 by the gears 393 and 386. The material then enters the outlet chamber 400 via the outlet recess 399.

A threaded cap member 401 is received by the flange 377 and closes the annular chamber 387. The cap member 401 may be provided with a knurled periphery to facilitate its assembly.

The inventors claim:

1. In a mixer for viscous materials: a body having wall means forming a substantially cylindrical recess open at one end; a rotary chopper member in the recess, and having a peripheral shoulder resting upon the edges about the open end of said recess, said member having a plurality of angularly and axially spaced projections; means forming an inlet to said recess opening between the member and the walls of said recess at the bottom of said recess; means forming an outlet passage past the shoulder of said rotary member; and a cap cooperating with said open end of said recess, and having passage forming means for conducting material from said outlet.

2. In a mixer for viscous materials: a body having wall means forming a substantially cylindrical recess open at one end; a rotary chopper member in the recess, and having a peripheral shoulder resting upon the edges about the open end of said recess, said member having a plurality of angularly and axially spaced projections; means forming an inlet to said recess opening between the member and the walls of said recess at the bottom of said recess; means forming an outlet passage past the shoulder of said rotary member; a cap cooperating with said open end of said recess, and having passage forming means for conducting material from said outlet; and a gear pump structure in said passage means, and operated by said rotary member.

3. In a mixer for viscous materials: a body having wall means forming a substantially cylindrical recess open at one end; a rotary chopper member in the recess, and having a peripheral shoulder resting upon the edges about the open end of said recess, said member having a plurality of angularly and axially spaced projections; means forming an inlet to said recess opening between the member and the walls of said recess at the bottom of said recess; means forming an outlet passage past the shoulder of said rotary member; said member having a first gear element located beyond the open end of said recess; a cap cooperating with said open end of said recess and accommodating said gear element; a second gear element carried by said cap and in engagement with said first gear element; and means for conducting material from said outlet past gear elements and outwardly of the cap.

4. In apparatus for mixing viscous materials; a support; a cylinder secured to the support; a piston in the cylinder; means for admitting a batch of material into one end of the cylinders; a lead screw connected to the piston for moving the piston toward said one end of the cylinder; a rotary drive for operating said lead screw; means carried by the support and forming a mixing chamber; conduit means opening at one end adjacent said one end of said cylinder and opening at the other end in said mixing chamber for passing material from said cylinder to said chamber upon movement of the piston toward said one end of said cylinder; a hollow rotary mixing member in the chamber; a one-way clutch carried in said hollow member; and means connecting said clutch to said rotary drive so that the rotary drive operates both the mixing member and said lead screw.

5. In a mixer for viscous materials: a support having a socket; a body partially and threadedly received in the socket and having a through passage open at both ends; one end of said passage being exposed and accessible at the bottom of said socket and the other end of said passage being located adjacent the outer end of said socket; said body and support having at least two spaced sets of aligned ports for admission of constituent materials into said body passage, the sets of aligned ports being spaced angularly, about the axis of the socket; a driving shaft extending from the bottom of the socket into said one end of said passage, and mounted by said support; a mixing member in the body passage and having provisions at one end for axially detachable engagement with said shaft; a closure member detachably fastened to the outer end of said body and confining said mixing member in the passage against axial detachment from said shaft; said closure member having passage means registering with said other end of said body passage for conducting material outwardly of said body; means secured to the support forming therewith a first closed container for one constituent material, and which registers with one of said support ports; and means secured to the support forming therewith a second separate closed container for a second constituent material, and which registers with another of said support ports; the said container forming means being angularly spaced about said socket.

6. In a mixer for viscous materials: a support having a socket; a body partially and threadedly received in the socket and having a through passage open at both ends; one end of said passage being exposed and accessible at the bottom of said socket and the other end of said passage being located adjacent the outer end of said socket; said body and support having at least two spaced sets of aligned ports for admission of constituent materials into said body passage, the sets of aligned ports being spaced angularly about the axis of the socket; a driving shaft extending from the bottom of the socket into said one end of said passage, and mounted by said support; a mixing member in the body passage and having provisions at one end for axially detachable engagement with said shaft; a closure member detachably fastened to the outer end of said body and confining said mixing member in the passage against axial detachment from said shaft; said closure member having passage means registering with said other end of said body passage for conducting material outwardly of said body; said passage means including two communicating parts spaced in a direction parallel to the axis of the mixing member; a first gear member joined to the other end of said mixing member and intersecting both of the parts of said closure member passage means at axially spaced positions along said first gear member; a pair of second gear members supported by the closure member, one of said second gear members being engaged by said first gear member for urging material through one part of said passage means, and the other of said second gear members being engaged by said first gear member for urging material through the other part of said passage means; means secured to the support forming therewith a first closed container for one constituent material, and which registers with one of said support ports; and means secured to the support forming therewith a second separate closed container for a second constituent material, and which registers with another of said support ports; the said container forming means being angularly spaced about said socket.

7. In a mixer: a body member having a passage as well as a substantially cylindrical mixing chamber forming a part of the passage; a rotary mixing member in the chamber and having a series of projections arranged in spaced helical sequence about the periphery of the mixing member, there being at least two complete helical turns of the projections; means for rotating the mixing member in a direction so that said helically arranged projections tend to move material toward one end of the passage; means for admitting material into said one end of said passage and forcing material through the passage despite the action of said helically arranged projections; said forcing means including a movable wall for squeezing material into said one end of said passage, a reversible means for operating both the mixing member and said movable wall whereby a charge of material may be inserted in advance of the wall; and a one-way drive between said means and said mixing member whereby, upon retraction of the wall, the angular movement of said mixing member does not reverse and tend to urge material to the other end of said passage.

8. In a mixer: a body member having a passage as well as a substantially cylindrical mixing chamber forming a part of the passage; a rotary mixing member in the chamber and having a series of projections arranged in spaced helical sequence about the periphery of the mixing member, there being at least two complete helical turns of the projections; means for rotating the mixing member in a direction so that said helically arranged projections tend to move material toward one end of the passage; means for admitting material into said one end of said passage and forcing material through the passage despite the action of said helically arranged projections; said forcing means including a movable wall for squeezing material into said one end of said passage, a reversible means for operating both the mixing member and said movable wall whereby a charge of material may be inserted in advance of the wall; and a manually operable valve for selectively closing the other end of said passage.

References Cited in the file of this patent
UNITED STATES PATENTS

| | | |
|---|---|---|
| 277,233 | Clark | May 8, 1883 |
| 1,225,368 | Severy | May 8, 1917 |
| 1,436,743 | Wild | Nov. 28, 1922 |
| 1,516,968 | Johnson | Nov. 25, 1924 |
| 1,611,452 | Johnson | Dec. 21, 1926 |
| 1,624,567 | Teague | Apr. 12, 1927 |
| 1,671,868 | McGougan et al. | May 29, 1928 |
| 1,799,950 | Boyd | Apr. 7, 1931 |
| 1,988,743 | McKenzie | Jan. 22, 1935 |
| 2,015,056 | Barnes | Sept. 24, 1935 |
| 2,092,992 | Thalman | Sept. 14, 1937 |
| 2,295,121 | McLean | Sept. 8, 1942 |
| 2,344,594 | Bryant | Mar. 21, 1944 |
| 2,347,100 | Grocott | Apr. 18, 1944 |
| 2,515,201 | Dulmage et al. | July 18, 1950 |
| 2,572,049 | Oakes | Oct. 23, 1951 |
| 2,577,896 | Kinton | Dec. 11, 1951 |
| 2,619,330 | Willems | Nov. 25, 1952 |
| 2,662,243 | Schnuck et al. | Dec. 15, 1953 |
| 2,683,420 | Hill et al. | July 13, 1954 |
| 2,688,470 | Marco | Sept. 7, 1954 |
| 2,738,732 | Wales | Mar. 20, 1956 |
| 2,754,542 | Henning et al. | July 17, 1956 |

FOREIGN PATENTS

| | | |
|---|---|---|
| 217,474 | Germany | Feb. 25, 1908 |
| 572,665 | Great Britain | Oct. 18, 1945 |